US009503913B2

(12) United States Patent
Ashikhmin et al.

(10) Patent No.: US 9,503,913 B2
(45) Date of Patent: Nov. 22, 2016

(54) DISTRIBUTED GENERATION OF SLOW-FADING POST-CODING VECTORS FOR LSAS COMMUNICATION NETWORKS AND THE LIKE

(71) Applicant: Alcatel-Lucent USA Inc., Murray Hill, NJ (US)

(72) Inventors: Alexei Ashikhmin, Morristown, NJ (US); Thomas L. Marzetta, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 88 days.

(21) Appl. No.: 14/173,230

(22) Filed: Feb. 5, 2014

(65) Prior Publication Data

US 2015/0223227 A1 Aug. 6, 2015

(51) Int. Cl.
*H04W 16/32* (2009.01)
*H04B 17/21* (2015.01)
*H04B 17/364* (2015.01)
*H04B 17/373* (2015.01)
*H04B 17/391* (2015.01)
*H04B 7/02* (2006.01)

(52) U.S. Cl.
CPC ............ *H04W 16/32* (2013.01); *H04B 17/21* (2015.01); *H04B 17/364* (2015.01); *H04B 17/373* (2015.01); *H04B 17/3911* (2015.01); *H04B 7/024* (2013.01)

(58) Field of Classification Search
CPC .................................................. H04W 16/32
See application file for complete search history.

(56) References Cited

U.S. PATENT DOCUMENTS 7,653,120 B2  1/2010 Chen et al.
2008/0299917 A1* 12/2008 Alexiou et al. ............... 455/103
(Continued)

FOREIGN PATENT DOCUMENTS

EP       2129173 A1    12/2009
WO   WO2015119745 A1   8/2015

OTHER PUBLICATIONS

Ashikhmin, Alexei et al., "Pilot Contamination Precoding in Multi-Cell Large Scale Antenna Systems", 2012 IEEE International Symposium on Information Theory Proceedings, Jul. 1, 2012, pp. 1137-1141.*

(Continued)

*Primary Examiner* — Dang Ton
*Assistant Examiner* — Nourali Mansoury
(74) *Attorney, Agent, or Firm* — Mendelsohn Dunleavy, P.C.; Steve Mendelsohn

(57) ABSTRACT

In one embodiment, a cellular wireless communications network, such as a large-scale antenna system (LSAS) network, having multiple base stations is logically divided into overlapping, virtual, truncated networks, where each base station functions as the master of a different truncated network, and each truncated network also has one or more base stations that function as slaves to that master base station. Each master base station generates estimated slow-fading coefficients and a slow-fading post-coding (SFP) vector based only on the wireless units current located within its truncated network. In particular, to generate the SFP vector, the master collects estimated slow-fading coefficients and estimated uplink data symbols from its slaves. The master uses the SFP vector to update its own estimated uplink data symbols for the wireless units currently located within its own cell.

11 Claims, 1 Drawing Sheet

(56) References Cited

U.S. PATENT DOCUMENTS

| | | | |
|---|---|---|---|
| 2010/0144334 A1* | 6/2010 | Gorokhov | H04L 5/0035 455/418 |
| 2011/0080972 A1* | 4/2011 | Xi et al. | 375/267 |
| 2012/0188889 A1* | 7/2012 | Sambhwani et al. | 370/252 |
| 2013/0070621 A1 | 3/2013 | Marzetta et al. | |
| 2013/0156021 A1 | 6/2013 | Ashikhmin et al. | |

OTHER PUBLICATIONS

Marzetta, T. L. et al., "Noncooperative Cellular Wireless with Unlimited Numbers of Base Station Antennas," IEEE Transactions on Wireless Communications, Nov. 2010, vol. 9, No. 11, pp. 3590-3600.

International Search Report and Written Opinion; Mailed Apr. 21, 2015 for the corresponding PCT Application No. PCT/US2015/011076.

Li, L., et al., "Pilot Contamination Precoding for Interference Reduction in Large Scale Antenna Systems," 51st Annual Allerton Conference on Communication, Control, and Computing, Allerton House, UIUC, Illinois, USA, IEEE, Oct. 2-3, 2013, pp. 226-232.

Adhikary, A., et al. "Uplink Interference Reduction in Large Scale Antenna Systems," 2014 IEEE International Symposium on Information Theory (ISIT), pp. 2529-2533.

* cited by examiner

DISTRIBUTED GENERATION OF SLOW-FADING POST-CODING VECTORS FOR LSAS COMMUNICATION NETWORKS AND THE LIKE

BACKGROUND

1. Field of the Invention

The invention relates to cellular wireless communication that uses multiple antennas to achieve improved network performance.

2. Description of the Related Art

This section introduces aspects that may help facilitate a better understanding of the invention. Accordingly, the statements of this section are to be read in this light and are not to be understood as admissions about what is prior art or what is not prior art.

An LSAS (large-scale antenna system) communication network has a multiplicity of base stations distributed over a (potentially large) geographic region, where each base station has a (potentially large) multi-antenna array that is used to communicate with each of one or more wireless (e.g., mobile) units located within the cell (i.e., coverage area) corresponding to the base station. In order to successfully recover information transmitted from each of its wireless units, each base station compensates its received uplink signals based on characterizations of the different uplink channels through which the uplink signals propagate from the different wireless units to the base station.

Each wireless unit has a unique uplink propagation channel to each antenna of a base station. In order for the base station to determine the channel characteristics of each uplink channel, the wireless units currently located in a cell are assigned different, known pilot sequences that the wireless units transmit during the initial pilot portion of each transmission period (referred to as a "coherence interval" or "slot"). A base station estimates the channel characteristics for each wireless unit by processing the received pilot portion using the known pilot sequence assigned to that wireless unit. The base station then uses those estimated channel characteristics to process and recover information from the subsequent, user-data portion of the coherence interval.

In some communication networks, each wireless unit within a given cell is assigned an orthogonal pilot sequence so that all of the wireless units within the cell can transmit synchronously (i.e., at the same time), and the base station can still accurately estimate the uplink channel characteristics for each of the different wireless units. In particular, wireless units in all cells synchronously send uplink signals, which propagate to all antennas of the base stations. Each base station uses these pilot sequences to estimate the channel state information (CSI) (also known as fast- and slow-fading channel vectors) between each of its antennas and the wireless units located in its cell. All base stations use their CSI estimates to process uplink signals from the wireless units located in their cells. This allows a base station to significantly reduce interference among the uplink transmissions in its own cell and from uplink signals of wireless units located in other cells.

There are two different types of channel characteristics: (i) fast-fading characteristics (aka small-scale fading characteristics), which are different for each different uplink channel (and for each different frequency sub-band, e.g., for OFDM communications) to each different antenna of a base station from each of its wireless units, and (ii) slow-fading characteristics (aka large-scale fading characteristics), which, at any given time, can be assumed to be the same for all of the different uplink channels (and all of the different frequency sub-bands) between a base station and a wireless unit. As their names suggest, fast-fading characteristics change more quickly than do slow-fading characteristics as the terminals move.

In a typical LSAS network, each base station processes the received user-data signals from each wireless unit by applying both fast-fading coefficients and slow-fading coefficients to compensate for the respective fast-fading and slow-fading characteristics of the particular uplink channels from that wireless unit. Because the fast-fading and slow-fading characteristics of a channel change at different rates, the fast-fading coefficients are updated more frequently (e.g., once every coherence interval) than the slow-fading coefficients (e.g., once every 40 or so coherence intervals).

In typical LSAS networks, although the pilot sequences are unique for the wireless units within a cell, the same pilot sequences may be re-used in different cells. Thus, two or more wireless units in two or more different cells may be assigned the same pilot sequence. As such, in addition to channel noise within the cell, the channel characteristics for a given wireless unit are also a function of interference from other wireless units in other cells using the same pilot sequence.

In a possible implementation of an LSAS network, each base station could be implemented to independently determine its own slow-fading and fast-fading coefficients without any communication from any other base station. U.S. Patent Application Publication No. US20130156021 ("the '021 application"), the teachings of which are incorporated herein by reference in their entirety, describes a technique that can dramatically reduce inter-cell interference and achieve very high data transmission rates with very small communication between base stations. According to that technique, each base station estimates the slow-fading coefficient between itself and each wireless unit in the network and then transmits those slow-fading coefficients to a centralized controller, which processes all of the different slow-fading coefficients received from all of the different base stations to generate a different slow-fading post-coding (SFP) vector for each different base station. The centralized controller distributes those different SFP vectors to the different base stations, each of which then uses its received SFP vector to compensate for slow-fading uplink channel characteristics when processing its received uplink user-data signals.

As LSAS networks continue to grow larger, the amount of communication involved in the centralized generation of slow-fading post-coding vectors becomes prohibitively expensive and impractical.

SUMMARY

In one embodiment of the disclosure, a communication network comprises N base stations, each base station capable of communicating with one or more wireless units within a corresponding cell. The network is logically divided into N overlapping, virtual, truncated networks. Each base station functions as a master base station for a different one of the N truncated networks. Each truncated network comprises a subset of the plurality of base stations, the subset consisting of the master base station and one or more slave base stations. For each truncated network, the master base station compensates its estimated uplink data for slow-fading characteristics based on slow-fading information received from only the one or more slave base stations.

Another embodiment of the disclosure is a base station for the communication network described in the previous paragraph.

Another embodiment of the disclosure is a method for processing uplink data in a communication network comprising N base stations, each base station capable of communicating with one or more wireless units within a corresponding cell. For a jth cell in the communication network, estimated slow-fading coefficients are acquired for wireless units currently located in a subset of cells in the communication network, the subset comprising the jth cell and one or more other cells in the communication network. Estimated uplink data is acquired for wireless units currently located in the subset of cells. Slow-fading post-coding (SFP) vectors are generated for wireless units currently located in the jth cell based on the acquired estimated slow-fading coefficients and the acquired estimate uplink data, wherein the SFP vectors are used to update the estimated uplink data for the wireless units currently located in the jth cell.

BRIEF DESCRIPTION OF THE DRAWINGS

Other embodiments of the invention will become more fully apparent from the following detailed description, the appended claims, and the accompanying drawings in which like reference numerals identify similar or identical elements.

DETAILED DESCRIPTION

Figure 1:
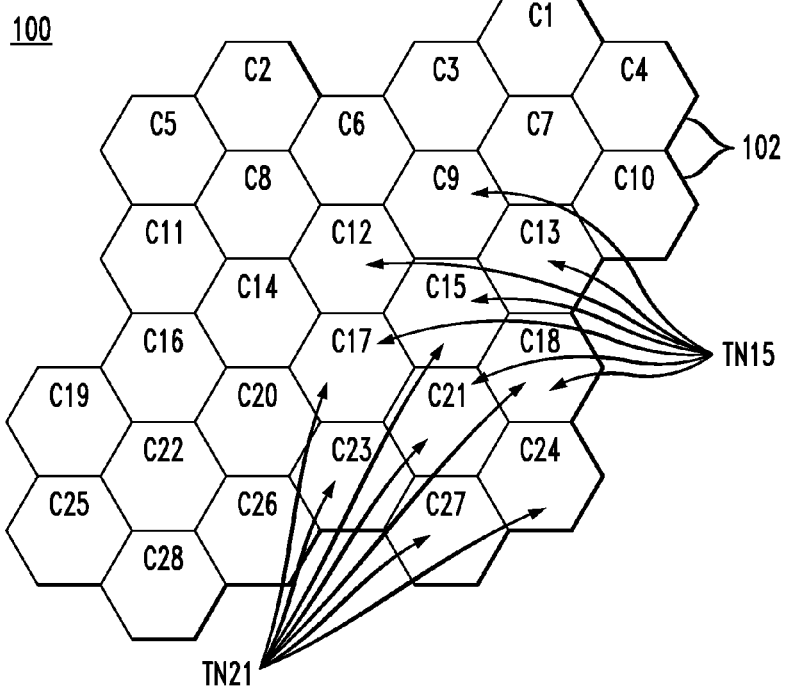
FIG. 1 shows a representation of an idealized, exemplary LSAS (large-scale antenna system) communication network.

According to certain embodiments of the disclosure, an LSAS communication network has a plurality of base stations, where each base station is capable of communicating with one or more wireless units. The LSAS network is logically divided into multiple, overlapping, virtual, truncated networks (aka clusters), where each base station functions as a master for a different truncated network, and each truncated network comprises a subset of the base stations in the LSAS network, where the subset consists of the master base station and one or more other base stations that function as slaves to the master base station in that truncated network. As used herein, the term "subset" refers to two or more but fewer than all of the elements of a set. Thus, the phrase "a subset of the base stations in an LSAS network having N base stations" refers two or more but not all of those N base stations.

For each truncated network, the master base station and each slave base station generate estimates of received uplink data based on specified fast- and slow-fading coefficients, and the slave base stations transmit at least some of their resulting estimated uplink data to the master base station, which generates a slow-fading post-coding vector based on its own estimated uplink data and the estimated uplink data from each of its slave base stations. The master base station then updates its own estimated uplink data based on its own slow-fading post-coding vector.

Since each different base station is the master of a different truncated network, each base station will generate its own slow-fading post-coding vector for its own use. As such, no base station or any centralized controller in the LSAS network is needed to generate the slow-fading post-coding vector for any other base station. Furthermore, since each truncated network includes only a subset of the base stations in the LSAS network, each base station does not need to transmit its slow-fading coefficients to all of the other base stations or to a centralized controller, and each base station does not need to receive slow-fading coefficients from all of the other base stations or from a centralized controller. Rather, each base station needs to transmit its slow-fading coefficients only to those other base stations for which the first base station is itself a slave, and each base station needs to receive slow-fading coefficients only from those other base stations in the truncated network for which the first base station is the master. This eliminates the need for a centralized controller to generate slow-fading post-coding vectors.

The '021 application describes a particular technique for generating slow-fading post-coding vectors. This particular technique works well for very large numbers of antennas, like 10,000 and more. The technique assumes that all base stations in the entire network cooperate (communicate) with each other either directly or via a controller. The technique has bad performance in the case of relatively small numbers of base station antennas and is not applicable at all when a base station can cooperate (communicate) with only some base stations of the network, for example, with only the base stations located in a truncated network. For example, in one possible implementation of the present disclosure, each truncated network consists of the master base station and only its nearest neighboring base stations.

FIG. 1 shows a representation of an idealized, exemplary LSAS network 100 having a honeycomb of 28 hexagonal cells 102 labeled C1-C28, each having a centrally located base station (not shown), referred to collectively as corresponding base stations BS1-BS28. According to the present disclosure, LSAS network 100 is (logically) divided into 28 truncated networks TN1-TN28, where the ith base station BSi is the master of the ith truncated network TNi. As indicated in FIG. 1, truncated network TN21 includes cells C15, C17, C18, C21, C23, C24, and C27, where base station BS21 is the master, and base stations BS15, BS17, BS18, BS23, BS24, and BS27 are the six slaves. Similarly, truncated network TN15 includes cells C9, C12, C13, C15, C17, C18, and C21, where base station BS15 is the master, and base stations BS9, BS12, BS13, BS17, BS18, and BS21 are the six slaves. Note that truncated network TN 27 includes only four cells C21, C23, C24, and C27, where base station BS27 is the master, and base stations BS21, BS23, and BS24 are the three slaves.

In this exemplary LSAS network, each truncated network TNi includes the nh cell and only its nearest neighboring cells. In other possible LSAS networks, truncated networks may comprise other subsets of cells, including cells that are further away, such as the next nearest neighboring cells in addition to the nearest neighboring cells.

According to certain embodiments of the present disclosure, all of the base stations generate estimates of their received uplink data and estimated slow-fading coefficients, and each base station provides at least some of its estimated uplink data and estimated slow-fading coefficients to each of the other base stations that is the master in a truncated network in which the first base station is a slave. Thus, in LSAS network 100 of FIG. 1, base station BS21 will transmit at least some of its estimated uplink data and estimated slow-fading coefficients to each of base stations BS15, BS17, BS18, BS23, BS24, and BS27, because base station BS21 is a slave in each of truncated networks TN15, TN17, TN18, TN23, TN24, and TN27. In addition, each of base stations BS15, BS17, BS18, BS23, BS24, and BS27 transmits at least some of its estimated uplink data and estimated slow-fading coefficients to base station BS21, because those six base stations are all slaves of truncated network TN21.

Base station BS21 then uses its own estimated uplink data and estimated slow-fading coefficients as well as the estimated uplink data and estimated slow-fading coefficients received from its six slaves to generate its own SFP vectors, which base station BS21 uses to update its own estimated uplink data. By the same token, each other base station acting as the master of its own truncated network will do likewise to generate and apply its own SFP vectors to update its own estimated uplink data.

Figure 2:
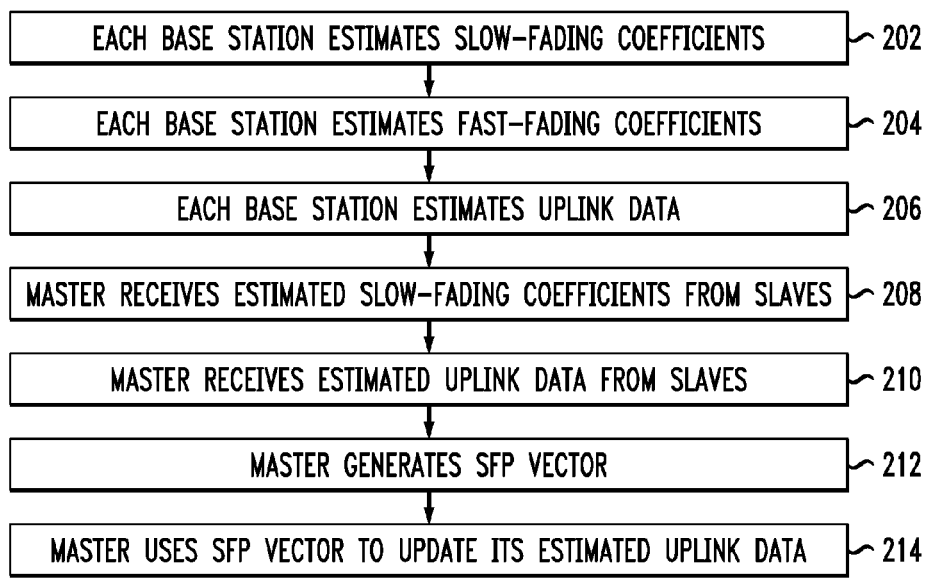
FIG. 2 shows a high-level flow diagram of certain processing implemented within each truncated network in the LSAS network of FIG. 1 according to one embodiment of the disclosure.

FIG. 2 shows a high-level flow diagram of certain processing implemented within each truncated network TNj in LSAS network 100 of FIG. 1 according to one embodiment of the disclosure. In step 202, the master base station BSj and the one or more slave base stations in truncated network TNj estimate their own slow-fading coefficients, e.g., using conventional LSAS techniques such as those described in the '021 application. In step 204, the master base station BSj and each slave base station in truncated network TNj estimate their own fast-fading coefficients, e.g., using conventional LSAS techniques such as those described in the '021 application. In step 206, the master base station BSj and each slave base station in truncated network TNj estimate their own uplink data received from each wireless unit in truncated network TNj.

In step 208, each slave in truncated network TNj sends its estimated slow-fading coefficients to master BSj and, in step 210, each slave in truncated network TNj sends its estimated uplink data to master BSj. In step 212, master BSj generates its own slow-fading post-coding (SFP) vector. In step 214, master BSj uses the SFP vector to update its own estimated uplink data.

FIG. 2 shows the steps performed within each different truncated network TNj in LSAS network 100 of FIG. 1. However, since each base station BSj is the master of one truncated network TNj and (typically) a slave in one or more other truncated networks, the steps shown in FIG. 2 can be performed once for all of the different truncated networks in LSAS network 100. In particular, each base station can perform steps 202-206 once for all of the truncated networks of which it is either the master or a slave. In addition, each base station in LSAS network 100 implements steps 208-214 one time for the truncated network for which it is the master.

Note that the steps shown in FIG. 2 correspond to the procedure implemented in a particular truncated network to enable the master to generate its own SFP vectors. Since fast-fading coefficients change much faster than slow-fading coefficients, the slow-fading coefficients and the SFP vectors do not need to be generated as frequently as the fast-fading coefficients. For a typical LSAS network, the fast-fading coefficients are generated every coherence interval, while the slow-fading coefficients and the SFP vectors are generated much less frequently. In addition, the generation of slow-fading coefficients and SFP vectors can be implemented off line, while normal processing continues unabated. For example, for each coherence interval, steps 204, 206, 210, and 214 are implemented by each base station to generate its estimated uplink data, while steps 202, 208, and 212 are implemented much less frequently for each base station to update its slow-fading coefficients and its SFP vectors. With regard to step 210, base station BSj needs vectors $\hat{s}^{[kj]}$ each time that wireless units transmit data in order to get the estimate $\hat{s}^{[kj]} = (a^{[kj]})^H \hat{s}^{[kj]}$, where the vector $\hat{s}^{[kj]}$ consists of the estimated uplink data from the slaves and from base station BSj itself) Note that, between updates of the slow-fading coefficients and SFP vectors, the most-recent slow-fading coefficients and SFP vectors are used to process uplink data each coherence interval until the next execution of their update processing is completed and the updated slow-fading coefficients and SFP vectors are ready to be employed.

The following provides a mathematical description of the processing of FIG. 2 as implemented by a particular base station BSj, which is the master of truncated network TNj. The same processing is implemented by every other base station in LSAS network 100 for the truncated network for which it is the master.

In step 202, base station BSj estimates the slow-fading coefficients $\beta_j^{[kl]}$ for all of the wireless units currently located within truncated network TNj, and possibly beyond the truncated network. Here, [kl] identifies the kth wireless unit in cell Cl, where l=1, ..., j, ..., $\hat{L}$; $\hat{L} \geq L$, and k= 1, ..., K, where L is the number of cells in truncated network TNj, $\hat{L}$ is the number of neighboring cells around cell Cj, which include all cells in truncated network TNj and possibly some cells beyond truncated network TNj and K is the maximum number of wireless units that can be currently located in any cell of LSAS network 100. Thus, the slow-fading coefficient $\beta_j^{[kl]}$ is estimated by base station BSj for the kth wireless unit in the lth cell, where the lth cell is either the cell of base station BSj or one of the $\hat{L}$ neighboring cells of cell Cj. Furthermore, base station BSj computes coefficients $$\eta^{[kj]} = \frac{\beta_j^{[kj]} \sqrt{p^{[kj]}}}{1 + \sum_{i=1}^{\hat{L}} \beta_j^{[ki]} p^{[ki]}}.$$

In the denominator of the last expression, the summation variable i runs through $\hat{L}$ neighboring cells of cell Cj. Note that, in general, the number of wireless units currently located in a cell can be different for each different cell Cl. Note further that the symbol k indicates that the wireless unit transmits the kth uplink pilot sequence $r_k$. Thus, wireless unit [kl] in cell Cl and wireless unit [kj] in cell Cj both transmit the same uplink pilot sequence $r_k$. At any given time, for the kth uplink pilot sequence, there might or might not be a wireless unit in cell Cl assigned that uplink pilot sequence.

In step 208, base station BSj receives the estimated slow-fading coefficients $\beta_l^{[kj]}$ for all of the wireless units currently located in cell Cj from all of the slave base stations BSl of truncated network TNj where l=1, ..., L and l≠j. Base station BSj also receives the coefficients $\eta^{[kl]}$ from all of the slave base stations BSl of truncated network TNj. Note that master BSj and each slave BSl of truncated network TNj each generate a (different) estimated slow-fading coefficient for each wireless unit [kj] currently located within cell Cj. Thus, for truncated network TNj having seven cells (i.e., master cell Cj and six slave cells), after step 208, base station BSj will have seven pairs of estimated slow-fading coefficients $\beta_l^{[kj]}$ and coefficients $\eta^{[kl]}$ for each wireless unit [kj] in cell Cj: one coefficient pair that it generated itself and one coefficient pair received from each of the six slaves of truncated network TNj.

Base station BSj uses the slow-fading coefficients from all of the base stations in truncated network TNj to form (up to) K (L×1) slow-fading vectors $\beta[kj]=(\beta_l^{[kj]})$ where each slow-fading vector $\beta^{[kj]}$ consists of the L slow-fading coefficients $\beta^{[kj]}$ for wireless unit [kj] in cell Cj from all of the L base stations in the truncated network TNj. There is one vector $\beta^{[kj]}$ for each of the up to K wireless units currently located in cell Cj.

Base station BSj uses the coefficients $\eta^{[kl]}$ to form K (L×L) diagonal matrices $D^{[kj]}=\text{diag}(\eta^{[kl]})$, where l=1, ..., L. There is one diagonal matrix $D^{[kj]}$ for each of the up to K wireless units currently located in cell Cj. The diagonal elements of matrix $D^{[kj]}$ are the weights that should be used in order to get unbiased SFP vectors in the equation $a^{[kj]}=E[\hat{s}^{[kj]}(\hat{s}^{[kj]})^H]^{-1}\sqrt{p^{[kj]}}\sqrt{q^{[kj]}}MD^{[kj]}\beta^{[kj]}$.

At the beginning of each coherence interval, all wireless units in all of the cells across the entire LSAS network transmit their uplink pilot sequences at corresponding pilot transmit power levels, which uplink pilot sequences propagate towards all M antennas of each base station. In particular, the kth mobile [kj] in cell Cj transmits $\sqrt{q^{[kj]}}r_k$, where $q^{[kj]}$ is the transmit power of wireless unit [kj] in cell Cj for transmitting the kth uplink pilot sequence $r_k$. In step 204, base station BSj uses up to K uplink pilot sequences to generate an (M×1) estimated fast-fading channel vector $\hat{h}^{[kj]}$ for each different wireless unit [kj] in cell Cj, where each estimated fast-fading channel vector $\hat{h}^{[kj]}$ has M fast-fading coefficients, one for each of the M antennas of base station BSj.

During the second (i.e., user-data) portion of each coherence interval, all wireless units across the entire network transmit uplink data symbols at corresponding data transmit power levels, which propagate towards all M antennas of each base station. In particular, the kth wireless unit [kj] in cell Cj transmits signal $\sqrt{p^{[kj]}}s^{[kj]}$, where $s^{[kj]}$ is an uplink data symbol. In response, all base stations across the entire network receive at their M antennas the uplink data signals transmitted by the wireless units. Thus, base station BSj generates an (M×1) complex vector $y_j$ for each uplink data symbol time period, where each of the M complex elements of $y_j$ represents the superposition of all uplink data signals received at a different one of the M antennas of base station BSj.

In step 206, for each uplink data symbol transmitted by each wireless unit [kj] in cell Cj, base station BSj generates an estimated complex uplink data symbol $\hat{s}^{[kj]}$ according to the following equation:

$$\hat{s}^{[kj]}=(\sqrt{\beta_j^{[kj]}}\hat{h}^{[kj]})^H y_j,$$

where H stands for the Hermitian matrix operator. The above equation performs an operation that is generally called "matched filtering." It will be recognized by those skilled in the art that alternative processing could be used here, for example "zero-forcing" or "minimum mean square linear estimation." The substitution of one of these alternative operations would, however, necessitate altering the equation for the SFP vectors that is shown three paragraphs earlier.

In step 210, for each uplink pilot sequence $r_k$ currently assigned to a wireless unit [kj] in cell Cj, base station BSj receives the estimated complex uplink data symbols $s^{[kl]}$ from the (L−1) slaves BSl in truncated network TNj that have wireless units [kl] that are assigned the same uplink pilot sequence. Base station BSj uses a value of 0 for a complex uplink data symbol estimate $\hat{s}^{[kl]}$ for a slave BSl that does not have a wireless unit [kl].

In step 212, for each wireless unit [kj] in cell Cj, base station BSj forms the (L×1) complex vector $\hat{s}^{[kj]}=(\hat{s}^{[kl]})$, where l=1, ..., L. Based on the most-recent sequence of uplink data symbols from wireless unit [kj], base station BSj numerically computes the expectation $E[\hat{s}^{[kj]}(\hat{s}^{[kj]})^H]$ using any suitable known technique, such as a moving average or an exponential smoothing technique. Base station BSj then computes the slow-fading post-coding (SFP) vector $a^{[kj]}$ using the following equation:

$$a^{[kj]}=E[\hat{s}^{[kj]}(\hat{s}^{[kj]})^H]^{-1}\sqrt{p^{[kj]}}\sqrt{q^{[kj]}}MD^{[kj]}\beta^{[kj]}.$$

In step 214, base station BSj uses the SFP vector $a^{[kj]}$ to update the estimated uplink data symbol $\hat{s}^{[kj]}$ for each wireless unit [kj] in cell Cj according to the following equation:

$$\tilde{s}^{[kj]}=(a^{[kj]})^H \hat{s}^{[kj]}.$$

According to an example embodiment disclosed above in reference to FIGS. 1-2, provided is a communication network comprising N base stations, each base station capable of communicating with one or more wireless units within a corresponding cell, wherein: the network is logically divided into N overlapping, virtual, truncated networks; each base station functions as a master base station for a different one of the N truncated networks; each truncated network comprises a subset of the plurality of base stations, the subset consisting of the master base station and one or more slave base stations; and for each truncated network, the master base station compensates its estimated uplink data for slow-fading characteristics based on slow-fading information received from only the one or more slave base stations.

In some embodiments of the above network, for each truncated network, the master base station compensates its estimated uplink data for the slow-fading characteristics based on (i) the slow-fading information received from the one or more slave base stations and (ii) estimated uplink data received from only the one or more slave base stations.

In some embodiments of any of the above networks, for each truncated network: the master base station acquires estimated slow-fading coefficients for wireless units currently located in the truncated network; the master base station acquires estimated uplink data for the wireless units currently located in the truncated network; the master base station generates slow-fading post-coding (SFP) vectors for wireless units currently located in its corresponding cell based on the acquired estimated slow-fading coefficients and the acquired estimated uplink data; and the master base station uses the SFP vectors to update the estimated uplink data for the wireless units currently located in its cell.

In some embodiments of any of the above networks, the master base station generates estimated slow-fading coefficients for the wireless units currently located in the truncated network; the master base station receives estimated slow-fading coefficients for the wireless units currently located in the truncated network generated by each slave base station in the truncated network; the master base station generates estimated uplink data for the wireless units currently located in its cell; and the master base station receives estimated uplink data for wireless units currently located in each corresponding slave cell in the truncated network generated by each slave base station in the truncated network.

In some embodiments of any of the above networks, the master base station and the one or more slave base stations each generates estimated fast- and slow-fading coefficients; the master base station and the one or more slave base stations each generates estimated uplink data based on its estimated fast- and slow-fading coefficients; each slave base station transmits estimated slow-fading coefficients and estimated uplink data to the master base station; the master base station generates one or more slow-fading post-coding (SFP) vectors based on its own estimated slow-fading coefficients, its own estimated uplink data, the estimated slow-fading coefficients from each slave base station, and the estimated uplink data from each slave base station; and the master base station updates its estimated uplink data based on the one or more SFP vectors.

In some embodiments of any of the above networks, each base station generates its estimated fast-coding coefficients more frequently than its estimated slow-fading coefficients and its one or more SFP vectors.

In some embodiments of any of the above networks, the master base station j generates each SFP vector $a^{[kj]}$ according to:

$$a^{[kj]} = E[\hat{s}^{[kj]}(\hat{s}^{[kj]})^H]^{-1}\sqrt{p^{[kj]}}\sqrt{q^{[kj]}}MD^{[kj]}\beta^{[kj]},$$

where:
E is an expectation operation;
H is a Hermitian matrix operation;
$\hat{s}^{[kj]}$ is an estimated uplink data vector for the kth wireless unit in the jth cell of the communication network;
$p^{[kj]}$ is uplink data transmit power for the kth wireless unit in the jth cell;
$q^{[kj]}$ is uplink pilot transmit power for the kth wireless unit in the jth cell;
M is a number of antennas of the jth base station;
$\beta^{[kj]}$ is an L-element slow-fading coefficient vector ($\beta_l^{[kj]}$);
L is the number of cells in the jth truncated network;
$\beta_l^{[kj]}$ is a slow-fading coefficient generated by the lth base station in the jth truncated network for the kth wireless unit in the jth cell; and
$D^{[kj]}$ is a diagonal matrix defined by:

$$D^{[kj]} = diag\left(\left(1 + \sum_{i=1}^{L} \beta_i^{[ki]}\right)/\left(\sqrt{p^{[kl]}} \beta_l^{[kl]}\right)\right).$$

Another example embodiment disclosed above in reference to FIGS. 1-2 is a base station for any of the above networks.

According to another example embodiment disclosed above in reference to FIGS. 1-2, provided is a method for processing uplink data in a communication network comprising N base stations, each base station capable of communicating with one or more wireless units within a corresponding cell, the method comprising, for a jth cell in the communication network: (a) acquiring estimated slow-fading coefficients for wireless units currently located in a subset of cells in the communication network, the subset comprising the jth cell and one or more other cells in the communication network; (b) acquiring estimated uplink data for wireless units currently located in the subset of cells; and (c) generating slow-fading post-coding (SFP) vectors for wireless units currently located in the jth cell based on the acquired estimated slow-fading coefficients and the acquired estimate uplink data, wherein the SFP vectors are used to update the estimated uplink data for the wireless units currently located in the jth cell.

In some embodiments of the above method, step (a) comprises: (a1) the jth base station generating estimated slow-fading coefficients for the wireless units currently located in the subset of cells; and (a2) the jth base station receiving estimated slow-fading coefficients for the wireless units currently located in the subset of cells generated by each other base station in the subset of cells; step (b) comprises: (b1) the jth base station generating estimated uplink data for the wireless units currently located in the jth cell; and (b2) the jth base station receiving estimated uplink data for wireless units currently located in each corresponding other cell in the communication network generated by each other base station in the subset of cells; step (c) is implemented by the jth base station; and the jth base station uses the SFP vectors to update the estimated uplink data for the wireless units currently located in the jth cell.

In some embodiments of any of the above methods, the communication network is logically divided into N overlapping, virtual, truncated networks; each base station functions as a master base station for a different one of the N truncated networks; each truncated network comprises a subset of the plurality of base stations, the subset consisting of the master base station and one or more slave base stations; and each base station implements steps (a)-(c) as the master base station of its corresponding truncated network.

Although the disclosure has been described in the context of embodiments in which each base station generates its own SFP vectors, in other embodiments, some or all SFP vectors may be generated at nodes of the communication network other than the base station(s) that will use those SFP vectors. For example, the communication network could have a number of distributed controllers, each of which generates and disseminates SFP vectors for a different subset of base stations.

Although the disclosure has been described in the context of cellular LSAS communication networks, other embodiments of the disclosure may involve another type of LSAS deployment called "cell-free LSAS," as described in U.S. patent application publication no. 20130070621, the teachings of which are incorporated herein by reference.

Various of the mathematical computations described above may be performed by digital processors situated at individual base stations. Without limitation, the digital processors may be any of general or special purpose digital computers, microprocessors, digital signal processors, or the like, acting under controls embodied in software, firmware, or hardware.

It will be understood that various approximations and alternative algorithms and mathematical formulations not explicitly described above may be used in implementations, without departing from the principles described above. Not least of these would be the setting of certain quantities, such as values of coefficients, to zero if their values lie below an appropriate threshold.

It should also be understood that the term "cell" is used herein in a broad sense to mean a cell, a sector, or any similarly defined reception area within a wireless network.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A communication network comprising N base stations, N>1, each base station configured to communicate with one or more wireless units within a corresponding cell, wherein:
   the network is logically divided into N overlapping, virtual, truncated networks;
   the each base station functions as a master base station for a different one of the N truncated networks;
   each truncated network comprises a subset of the N base stations, but not all of the N base stations, the subset consisting of the master base station and one or more slave base stations;
   the each truncated network shares at least one base station with at least one other truncated network;
   for the each truncated network, the master base station compensates its estimated uplink data for slow-fading characteristics based on slow-fading information received from only the one or more slave base stations;
   the master base station and the one or more slave base stations each generates its estimated fast- and slow-fading coefficients;
   the master base station and the one or more slave base stations each generates its estimated uplink data based on its estimated fast- and slow-fading coefficients;
   each slave base station transmits its estimated slow-fading coefficients and its estimated uplink data to the master base station;
   the master base station generates one or more slow-fading post-coding (SFP) vectors based on its own estimated slow-fading coefficients, its own estimated uplink data, the estimated slow-fading coefficients from the each slave base station, the estimated uplink data from each slave base station, uplink data transmit power for a corresponding wireless unit, and uplink pilot transmit power for the corresponding wireless unit; and
   the master base station updates its estimated uplink data based on the one or more SFP vectors.

2. The communication network of claim 1, wherein, for each truncated network, the master base station compensates its estimated uplink data for the slow-fading characteristics based on (i) the slow-fading information received from the one or more slave base stations and (ii) estimated uplink data received from only the one or more slave base stations.

3. The communication network of claim 1, wherein each base station generates its estimated fast-coding coefficients more frequently than its estimated slow-fading coefficients and its one or more SFP vectors.

4. The communication network of claim 1, wherein the master base station j generates each SFP vector $a^{[kj]}$ according to:

$$a^{[kj]} = E[\hat{s}^{[kj]}(\hat{s}^{[kj]})^H]^{-1}\sqrt{p^{[kj]}}\sqrt{q^{[kj]}}MD^{[kj]}\beta^{[kj]},$$

where:
   E is an expectation operation;
   H is a Hermitian matrix operation;
   $\hat{s}^{[kj]}$ is an estimated uplink data vector for the kth wireless unit in the jth cell of the communication network;

$p^{[kj]}$ is uplink data transmit power for the kth wireless unit in the jth cell;

$q^{[kj]}$ is uplink pilot transmit power for the kth wireless unit in the jth cell;

M is a number of antennas of the jth base station;

$\beta^{[kj]}$ is an L-element slow-fading coefficient vector $(\beta_l^{[kj]})$;

L is the number of cells in the jth truncated network;

$\beta_l^{[kj]}$ is a slow-fading coefficient generated by the lth base station in the jth truncated network for the kth wireless unit in the jth cell; and $D^{[kj]}$ is a diagonal matrix defined by:

$$D^{[kj]} = diag\left(\left(1 + \sum_{i=1}^{L} \beta_i^{[ki]}\right) / \left(\sqrt{p^{[kl]}} \beta_l^{[kl]}\right)\right).$$

5. A base station for a communication network comprising N base stations, N>1, each base station configured to communicate with one or more wireless units within a corresponding cell, wherein:

the network is logically divided into N overlapping, virtual, truncated networks;

the each base station functions as a master base station for a different one of the N truncated networks;

each truncated network comprises a subset of the N base stations, but not all of the N base stations, the subset consisting of the master base station and one or more slave base stations;

the each truncated network shares at least one base station with at least one other truncated network;

for the each truncated network, the master base station compensates its estimated uplink data for slow-fading characteristics based on slow-fading information received from only the one or more slave base stations;

the master base station and the one or more slave base stations each generates its estimated fast- and slow-fading coefficients;

the master base station and the one or more slave base stations each generates its estimated uplink data based on its estimated fast- and slow-fading coefficients;

each slave base station transmits its estimated slow-fading coefficients and its estimated uplink data to the master base station;

the master base station generates one or more slow-fading post-coding (SFP) vectors based on its own estimated slow-fading coefficients, its own estimated uplink data, the estimated slow-fading coefficients from the each slave base station, the estimated uplink data from each slave base station, uplink data transmit power for a corresponding wireless unit, and uplink pilot transmit power for the corresponding wireless unit; and the master base station updates its estimated uplink data based on the one or more SFP vectors.

6. The base station of claim 5, wherein, for each truncated network, the master base station compensates its estimated uplink data for the slow-fading characteristics based on (i) the slow-fading information received from the one or more slave base stations and (ii) estimated uplink data received from only the one or more slave base stations.

7. The base station of claim 5, wherein each base station generates its estimated fast-coding coefficients more frequently than its estimated slow-fading coefficients and its one or more SFP vectors.

8. The base station of claim 5, wherein the master base station j generates each SFP vector $a^{[kj]}$ according to:

$$a^{[kj]} = E[\hat{s}^{[kj]}(\hat{s}^{[kj]})^H]^{-1}\sqrt{p^{[kj]}}\sqrt{q^{[kj]}}MD^{[kj]}\beta^{[kj]},$$

where:

E is an expectation operation;

H is a Hermitian matrix operation;

$\hat{s}^{[kj]}$ is an estimated uplink data vector for the kth wireless unit in the jth cell of the communication network;

$p^{[kj]}$ is uplink data transmit power for the kth wireless unit in the jth cell;

$q^{[kj]}$ is uplink pilot transmit power for the kth wireless unit in the jth cell;

M is a number of antennas of the jth base station;

$\beta^{[kj]}$ is an L-element slow-fading coefficient vector $(\beta_l^{[kj]})$;

L is the number of cells in the jth truncated network;

$\beta_l^{[kj]}$ is a slow-fading coefficient generated by the lth base station in the jth truncated network for the kth wireless unit in the jth cell; and $D^{[kj]}$ is a diagonal matrix defined by:

$$D^{[kj]} = diag\left(\left(1 + \sum_{i=1}^{L} \beta_i^{[ki]}\right) / \left(\sqrt{p^{[kl]}} \beta_l^{[kl]}\right)\right).$$

9. A method for processing uplink data in a communication network comprising N base stations, each base station configured to communicate with one or more wireless units within a corresponding cell, the method comprising, for each jth cell in the communication network:

(a) a jth base station acquiring estimated slow-fading coefficients for wireless units currently located in a subset of cells in the communication network, the subset comprising the jth cell and one or more other cells in the communication network, wherein:

the communication network is logically divided into N overlapping, virtual, truncated networks;

the each base station functions as a master base station for a different one of the N truncated networks;

the subset of cells corresponds to one of the N truncated networks comprising a subset of the N base stations, but not all of the N base stations; and each truncated network shares at least one base station with at least one other truncated network;

(b) the jth base station acquiring estimated uplink data for wireless units currently located in the subset of cells;

(c) the jth base station generating slow-fading post-coding (SFP) vectors for wireless units currently located in the jth cell based on the acquired estimated slow-fading coefficients and the acquired estimated uplink data; and (d) the jth base station uses the SFP vectors to update the estimated uplink data for the wireless units currently located in the jth cell, wherein:

the master base station and the one or more slave base stations each generates its estimated fast- and slow-fading coefficients;

the master base station and the one or more slave base stations each generates its estimated uplink data based on its estimated fast- and slow-fading coefficients;

each slave base station transmits its estimated slow-fading coefficients and its estimated uplink data to the master base station;

the master base station generates one or more slow-fading post-coding (SFP) vectors based on its own estimated slow-fading coefficients, its own estimated uplink data, the estimated slow-fading coefficients from the each slave base station, the estimated uplink data from each slave base station, uplink data transmit power for a corresponding wireless unit, and uplink pilot transmit power for the corresponding wireless unit; and the master base station updates its estimated uplink data based on the one or more SFP vectors.

10. The method of claim 9, wherein:

step (a) comprises:
- (a1) the jth base station generating master estimated slow-fading coefficients for the wireless units currently located in the subset of cells; and
- (a2) the jth base station receiving slave estimated slow-fading coefficients for the wireless units currently located in the subset of cells generated by each other base station in the subset of cells;

step (b) comprises:
- (b1) the jth base station generating estimated uplink data for the wireless units currently located in the jth cell; and
- (b2) the jth base station receiving estimated uplink data for wireless units currently located in each corresponding other cell in the communication network generated by each other base station in the subset of cells;

step (c) is implemented by the jth base station; and the jth base station uses the SFP vectors to update the estimated uplink data for the wireless units currently located in the jth cell.

11. The method of claim 9, wherein:

the communication network is logically divided into N overlapping, virtual, truncated networks;

each base station functions as a master base station for a different one of the N truncated networks;

each truncated network comprises a subset of the plurality of base stations, the subset consisting of the master base station and one or more slave base stations; and each base station implements steps (a)-(c) as the master base station of its corresponding truncated network.

* * * * *